May 30, 1967

R. M. SHAH 3,322,956

METHOD AND APPARATUS FOR PHOTOELECTRICALLY MEASURING
AND RECORDING THE GROWTH OF MICRO-ORGANISMS IN
BACTERIAL PREPARATIONS

Filed May 14, 1963

INVENTOR.
RAMESH M. SHAH
BY
OLSEN & STEPHENSON

May 30, 1967  R. M. SHAH  3,322,956
METHOD AND APPARATUS FOR PHOTOELECTRICALLY MEASURING
AND RECORDING THE GROWTH OF MICRO-ORGANISMS IN
BACTERIAL PREPARATIONS
Filed May 14, 1963  2 Sheets-Sheet 2

INVENTOR.
RAMESH M. SHAH
BY OLSEN & STEPHENSON

United States Patent Office 3,322,956
Patented May 30, 1967

3,322,956
METHOD AND APPARATUS FOR PHOTOELECTRICALLY MEASURING AND RECORDING THE GROWTH OF MICRO-ORGANISMS IN BACTERIAL PREPARATIONS
Ramesh M. Shah, 743 Packard, Ann Arbor, Mich. 48104
Filed May 14, 1963, Ser. No. 280,373
7 Claims. (Cl. 250—218)

This invention relates generally to apparatus for automatically examining a plurality of bacterial specimens and automatically recording certain pre-selected data obtained from the examination, and more particularly to an improved method and apparatus for automatically measuring and recording data with respect to the growth of micro-organisms in bacterial preparations.

Micro-biology has become an important field for basic research, and considerable time and effort is being devoted to research in this field. This research often involves detailed examination of a plurality of specimens of varying concentrations of a bacterial preparation, and these examinations often require periodic attention of research personnel over prolonged time periods. This necessarily consumes the time of valuable research personnel, and where the periodic examinations must be made at frequent time intervals, the preparations often involve around the clock attention. When these examinations are carried out manually there is always the possibility of human error, especially when around the clock attention is required. Furthermore, a large number of micro-organisms require aeration in order to carry out their normal biological functions. Consequently, it is necessary for the researcher to manually aerate specimens containing these organisms in order to promote growth of the organisms during the testing period. This aeration requirement, therefore, places an added burden on the time and energy of research personnel.

It is an object of this invention, therefore, to provide an improved method and apparatus which will automatically effect aeration of the specimens, will automatically subject each of the specimens to the desired examination at pre-selected time intervals, and will also automatically record the desired data from each examination so that a permanent record of each test will be provided.

A further object of this invention is to provide versatile apparatus for accomplishing the desired automatic aeration of the specimens, measurement of the extent of bacterial growth in the specimens, and recording of this information, which can be readily adapted to the carrying out of less than the total number of these functions when desired.

Still a further object of this invention is to provide improved shaking apparatus for effecting aeration of bacterial preparations contained in test tubes.

Further objects, features and advantages of this invention will become apparent from a consideration of the following description, the appended claims, and the accompanying drawing in which:

Figure 1:
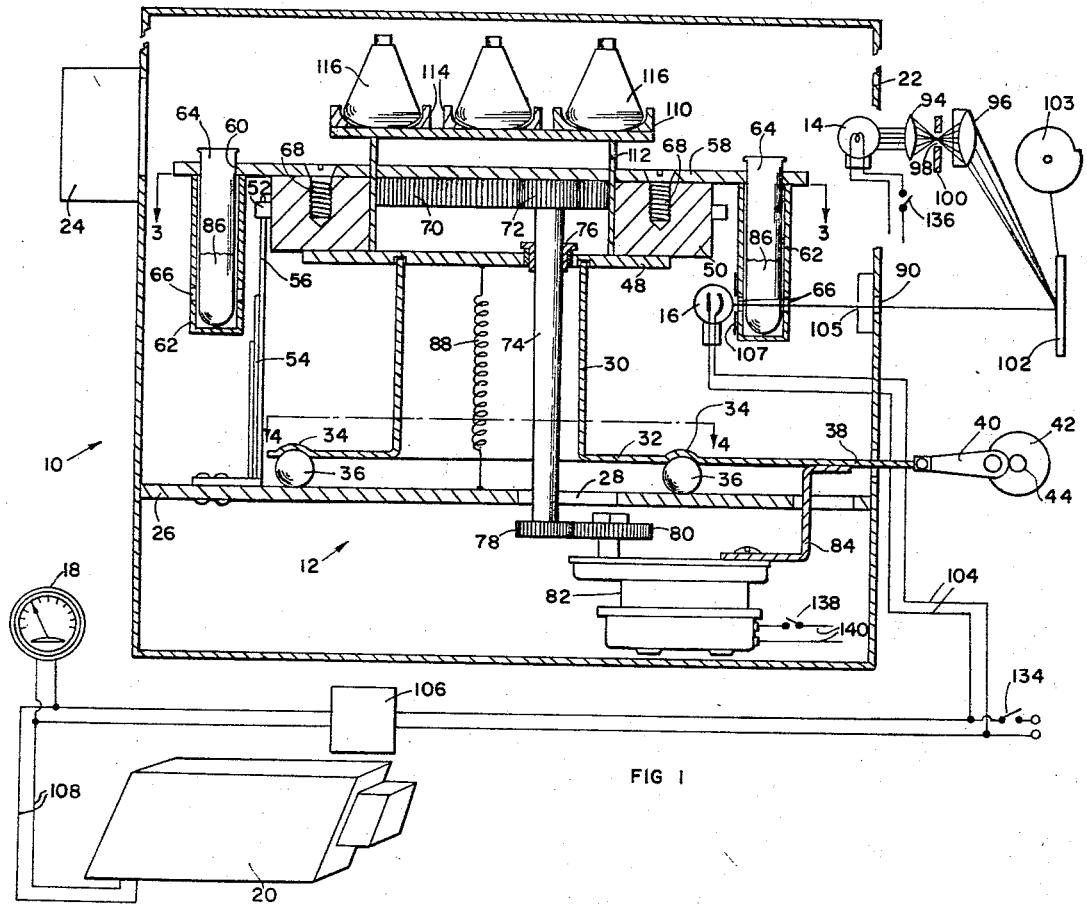
FIGURE 1 is a sectional view of the shaker assembly in the apparatus of this invention, showing the apparatus in one moved position, and showing the measuring and recording apparatus of this invention in assembly relation therewith.
Figure 3:
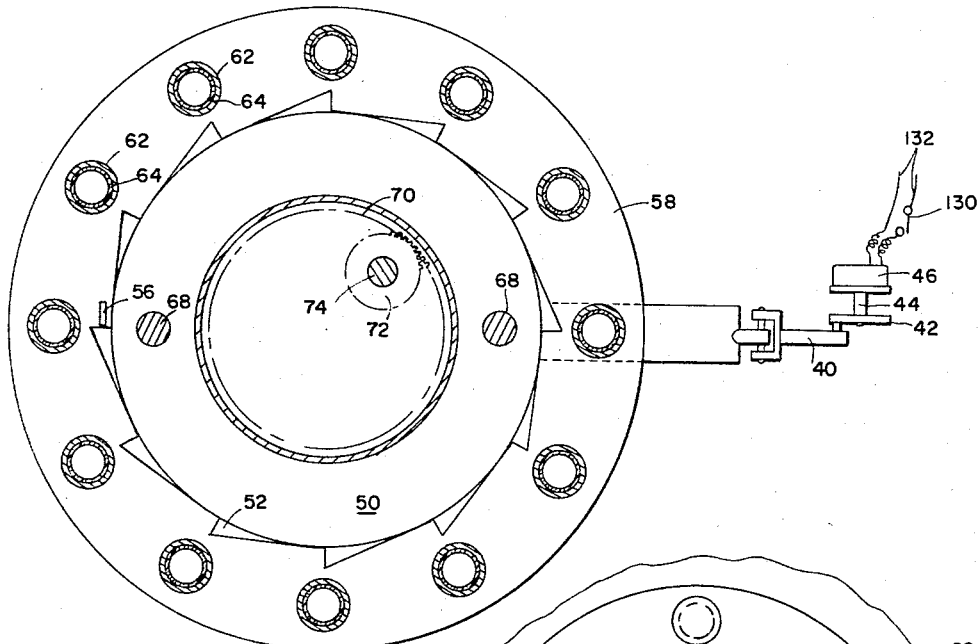
Figure 4:
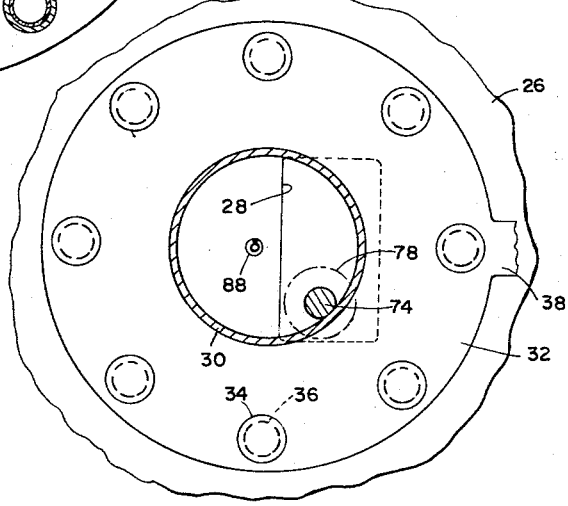
Figure 5:
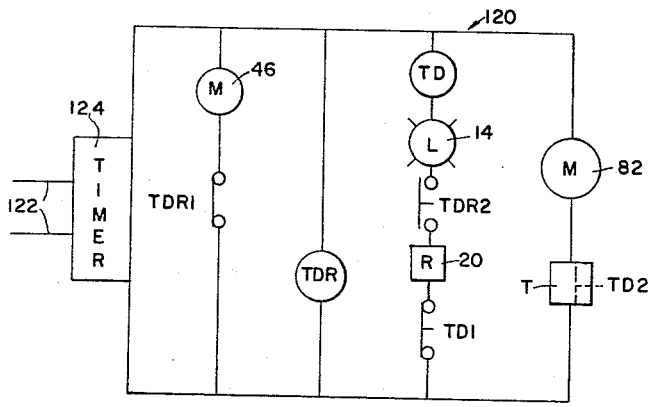

FIGURES 3 and 4 are sectional views looking along the lines 3—3 and 4—4, respectively, in FIG. 1; and FIGURE 5 is a diagrammatic view of the electrical control circuit for the electrical components in the apparatus of this invention.

With reference to the drawing, the apparatus of this invention, indicated generally at 10, is illustrated in FIG. 1 as including a shaker and specimen supporting unit 12, a light source 14, a photoelectric cell 16, a galvanometer 18 for measuring the degree of energization of the cell 16 and a recording apparatus 20 for recording readings on the galvanometer 18.

The specimen shaking and supporting apparatus 12 is positioned in an insulated enclosure or housing 22 (broken away in FIG. 1 merely to provide space on the drawing for showing the light source 14) to which a regulated heat source 24 is attached for maintaining the interior of the housing 22 at a constant pre-selected temperature. A support plate 26, mounted in a fixed position in the housing 22, has an opening 28 formed therein for a purpose to appear presently. A tubular support column 30 has a flange 32 at its lower end which is substantially parallel to the support plate 26 and is formed with a plurality of ball bearing retainer cups 34 which are circumferentially spaced about the flange 32. A ball bearing 36 is confined in each of the retainer cups 34 and rests on the top side of the support plate 26 so as to mount the support column 30 on the plate 26 for rotatable movement and for rolling back and forth movement in a substantially horizontal plane.

The flange 32 is formed with an integral shaker arm 38 which is pivotally connected to one end of a crank arm 40, the other end of which is pivotally connected to a crank disk 42 which is driven by the drive shaft 44 of an electric motor 46. Thus, on rotation of the drive shaft 44, the support column 30 is movable, at a fairly rapid rate, back and forth in a substantially horizontal direction with the balls 36 rolling on the support plate 26.

The upper end of the support column 30 has a plate 48 resting thereon and the plate 48 supports a ratchet ring 50 having ratchet teeth 52. A leaf spring 54 attached at its lower end to the support plate 26 is stressed so that its upper end 56 tends to move toward the right as viewed in FIG. 1, so that it is maintained in continual contact with the ratchet ring 50 during reciprocation of the ring 50 between the positions shown in FIGS. 1 and 2. The spring 54 prevents rotation of the ratchet ring 50 in a clockwise direction as viewed in FIG. 3 and tends to maintain the ring 50 in indexed positions corresponding to the positions of the teeth 52. Supported on the upper end of the ring 50 is a test tube support plate 58 which has a plurality of openings 60 formed therein which communicate with the upper ends of test tube holders 62, each of which is of a size to support a test tube 64 and is formed adjacent its lower end with the window openings 66, which are substantially aligned in a direction radially of the plate 58. Screws 68 connect the support plate 58 to the ring 50.

Radially inwardly of the test tube openings 60, the plate 58 has a ring gear 70 secured thereto. A pinion drive gear 72, positioned in meshing engagement with the gear 70, is carried on the upper end of a shaft 74 supported in a thrust bearing assembly 76 in the plate 48 and extended downwardly through the opening 28 in the plate 26. A gear 78 on the lower end of the shaft 74 meshes with a gear 80 driven by a motor 82 which is supported on a bracket 84 that is secured to and extends downwardly from the shaker arm 38.

It can thus be seen that on operation of the electric motor 82, the shaft 74 is rotated to rotate the test tube support plate 58 and the plate 48 with respect to the fixed support plate 26. During such rotation, the balls 36 roll on the support plate 26. Furthermore, on reciprocation of the shaker arm 38, the test tube support plate 58 is reciprocated to effect a shaking of the test tubes 64 and an aeration of the test tube contents 86. A coil spring 88 extends between the plate 48 and the support plate 26 for maintaining the ball retainers 34 in supported engagement with the top sides of the ball bearings 36. The spring 54 is positioned such that in the engaged position thereof with each of the ratchet teeth 52, a test tube 64 is positioned in substantially horizontal alignment with a window opening or light entrance slot 90 formed in the housing 22.

The photoelectric cell 16 is mounted in the housing 22 in a fixed position in substantially horizontal alignment with the window opening 90. A pair of lenses 94 and 96 (FIG. 1) are positioned on opposite sides of a small opening 98 in a translucent plate 100. Light from the source 14 impinges on the lens 94 which directs the light through the opening 98 and the lens 96 directs the focused light from lens 94 onto a monochromator 102 which in turn directs rays of monochromatic light through the housing opening 90. A cam 103, which forms a part of the monochromator 102, is adjustable to select the desired light wave length issuing from the monochromator 102. Light rays from the monochromator 102 are focused on an exit slit 105 inside the incubator 22. The photoelectric cell 16 is positioned in the path of these light rays and the test tube support plate 58 is positioned so that each of the test tubes 64 can be located in the path of the light rays at a position between the entrance opening 90 and the photoelectric cell 16. A filter 107, positioned adjacent cell 16 absorbs stray light before the selected wave length light rays reach cell 16. Consequently, the degree of energization of the photoelectric cell 16 is proportionate to the extent of growth of the micro-organisms in the contents 86 of the test tube 64. The photoelectric cell 16 is connected by leads 104 to an amplifier 106 which is connected in parallel with galvanometer 18 which is in turn connected by leads 108 to the recording mechanism 20 which makes a permanent record of the readings on the galvanometer 18.

In the operation of the apparatus 10, a flask support plate 110, may, if desired, be supported on the upper end of a tubular support member 112 supported at its lower end on the plate 48. Receivers 114 are provided on the plate 110 for retaining flasks 116 in fixed positions on the plate 110. The flasks 116 may be provided with bacterial preparations which are to be aerated and which are to be observed manually at time intervals of several hours, so that automatic observation of the flasks 116 is not required. The purpose of the flask supporting plate 110 is to adapt the apparatus 10 for full use of the incubator housing 22 during automatic examination of the growth of micro-organisms in the test tubes 64.

Figure 2:
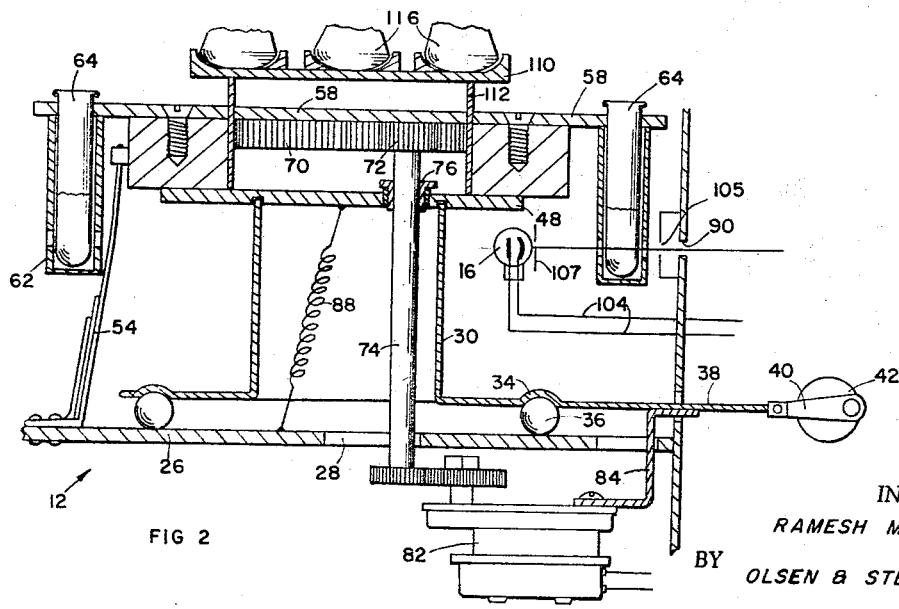
FIGURE 2 is a sectional view of the shaker apparatus of this invention, illustrated similarly to FIG. 1, showing a second moved position of the apparatus.

Assume that test tubes 64 are supported in each of the containers 62, as shown in FIGS. 1 and 2. The motor 46, the motor 82, the light source lamp 14 and the recorder 20 are connected in a control circuit 120 as shown in FIG. 5. The circuit 120 is connected through leads 122 to a suitable source of current. A timer 124 connected across the leads 122 operates to permit flow of current to the circuit 120 only at pre-selected time intervals. For example, if examination of the test tube contents 86 is desired at ten minute intervals, the timer 124 is set to permit flow of current to the circuit 120 at ten minute intervals. When the timer 124 times out at the end of a ten minute period, current is supplied to the shaker motor 46 which operates to reciprocate the test tube support 58 back and forth in a horizontal direction so as to shake the test tube contents 86 and thoroughly aerate and stir up the contents. Simultaneously with operation of the motor 46, a time delay relay TDR is energized and when the relay TDR times out, after a pre-selected time period corresponding to the desired period of shaking of the test tube contents 86, normally closed contacts TDR1, connected in series with the shaker motor 46 open so that shaking of the test tube contents 86 is terminated.

Normally open time delay relay contacts TDR2 close so as to energize the light source 14 and operate the recording apparatus 20 which are connected in series with a second time delay relay TD. At such time, light rays are directed through the opening 90, through the contents of the test tube 86 which is aligned with the opening 90 and onto the photoelectric cell 16. The intensity of the light transmitted to the photoelectric cell 16, which is proportionate to the extent of growth of micro-organisms in the aerated preparation 86 is measured by the galvanometer 18 and this measurement is recorded on the recording apparatus 20. When a sufficient time period has elapsed to provide for recording of this information, time delay relay TD times out so that normally closed contacts TD1 open to turn off the light source 14 and turn off the recording apparatus 20.

At the same time, time delay contacts TD2, associated with a timer T close so that the index motor 82 is operated to rotate the test tube holder 58 a distance sufficient to align the next test tube 64 with the housing opening 90. Immediately upon closing of the contacts TD2, the timer T is energized and it maintains the contacts TD2 closed for an interval sufficient to permit index rotation of the test tube holder 58 by motor 82, following which the timer T times out allowing contacts TD2 to open and de-energize the index motor 82. The two-way timer 124 is set for an operating interval such that it now opens to discontinue the supply of current to the circuit 120. When the pre-selected time interval has expired, the timer 124 again closes to supply current to the circuit 120 to repeat the above sequence.

In the event it is desired to eliminate the shaking and aerating step in the above-described process, a switch 130, connected in series with one of the leads 132 (FIG. 3) to the shaker motor 46 is opened. In the event only shaking and aerating of the test tube contents 86 is desired, a switch 134 (FIG. 1), in series with one of the leads 104, is opened so that the steps of energizing the galvanometer 18 and the recorder 20 are omitted from the above process. In such event, a switch 136, connected in series with the light source 14, is also opened. In the event manual indexing of the test tube support plate 58 is desired, or in the event a series of time spaced examinations of the contents 86 of a single test tube 64 only are desired, a switch 138 (FIG. 1) in series with one of the leads 140 for the index motor 82 is opened.

From the above description it can be seen that this invention provides apparatus for automatically aerating bacterial preparations so that the growth of the micro-organisms in the preparations can be measured and this growth automatically recorded at pre-selected time intervals. The apparatus 10 can be set up to operate over a prolonged time period without requiring any of the time and attention of research personnel. If desired, concurrently with this automatic testing and recording, flasks 116 can be subjected to the heat within the incubator 22 and to the shaking action of the shaker mechanism 12 without detracting in any way from the automatic measuring and recording function of the apparatus 10. This apparatus also provides a simple, economical and compact shaker 12 to provide for aeration of specimens in a fermentation process in a brewery laboratory.

It will be understood that the method and apparatus for measuring and recording the growth of micro-organisms in bacterial preparations which are herein disclosed and described are presented for purposes of explanation and illustration and are not intended to indicate limits of the invention, the scope of which is defined by the following claims.

What is claimed is:

1. The method of aerating a plurality of bacterial preparations to promote growth of micro-organisms therein and for measuring and recording such growth, said method comprising the steps of (a) providing a source of light rays and a photoelectric cell positioned in the path of said light rays for energization proportional to the intensity of the light transmitted thereto;

(b) simultaneously shaking at timed intervals said plurality of bacterial preparations in transparent containers therefor to effect aeration thereof;

(c) positioning one of said preparations while in its container and immediately following shaking thereof in the path of said light rays at a position between said source and said cell so that energization of the cell is proportionate to the extent of growth of the micro-organisms in said preparation;

(d) measuring the energization of said cell;

(e) recording the extent of said energization of said cell; and (f) in sequence after succeeding shakings of said plurality of bacterial preparations, repeating steps (c), (d) and (e) with respect to each of the other of said plurality of bacterial preparations.

2. In apparatus for measuring and recording data with respect to the potency of bacterial preparations, an enclosure, means for maintaining said enclosure at a substantially constant temperature, a stationary plate in said enclosure, a test tube support mounted on said plate for back and forth shaking movement relative thereto, a shaker arm connected to said support, means including a rotatable shaft for rotating said test tube support, means connected to said arm for imparting back and forth shaking movement thereto, and adapted to carry a plurality of test tubes containing specimens of a bacterial preparation, a window in said enclosure with which each of said test tubes are sequentially alignable on rotation of said test tube support, a light source for directing monochromatic light through said window, a photoelectric cell within said enclosure in substantially horizontal alignment with said window and located in said housing so that rays from said light source pass through said window and the test tube in alignment therewith to effect energization of the photoelectric cell proportionate to the concentration of the preparation in the test tube, means electrically connected to said cell for measuring the degree of energization thereof, and recording means operatively associated with said measuring means for recording the measurements thereof.

3. In apparatus for measuring and recording data with respect to the potency of bacterial preparations, an enclosure, a stationary plate in said enclosure, an upright hollow column support having a flanged lower end positioned above said plate, balls movably supporting said flanged lower end on said plate, a test tube support mounted on the upper end of said column support, means connected to said column support imparting back and forth shaking movement thereto, means including a rotatable shaft extending upwardly through said column support for rotating said test tube support, and relatively movable index means connected to said stationary plate and said test tube support.

4. In apparatus for measuring and recording data with respect to the potency of bacterial preparations, an enclosure, means for maintaining said enclosure at a substantially constant temperature, a stationary plate in said enclosure, a plurality of roller balls on said plate, an upright hollow column support having a flange at its lower end, said flange having a plurality of ball retainer cups formed therein each of which is supported on one of said balls, a test tube support mounted on the upper end of said column support, a shaker arm connected to said column support, means including a motor and a shaft driven thereby connected to said test tube support for rotating said column support on said balls, means connected to said arm for imparting back and forth shaking movement thereto so as to reciprocate said column support on said balls, a plurality of test tubes containing specimens of a bacterial preparation arranged in a circular formation and mounted on said support so as to depend therefrom, a window in said enclosure alignable with each of said test tubes on rotation of said test tube support, a light source for directing monochromatic light through said window, a photoelectric cell within said enclosure in alignment with said window and located in said housing so that rays from said light source pass through said window and the test tube in alignment therewith to effect energization of the photoelectric cell proportionate to the concentration of the preparation in the test tube, means electrically connected to said cell for measuring the degree of energization thereof, and recording means operatively associated with said measuring means for recording the measurements thereof.

5. In apparatus for measuring and recording data with respect to the potency of bacterial preparations, an enclosure, means for maintaining said enclosure at a substantially constant temperature, a stationary plate in said enclosure, a test tube support mounted on said plate for back and forth shaking movement relative thereto adapted to carry a plurality of test tubes containing specimens of a bacterial preparation, a shaker arm connected to said support, means for rotating said test tube support to locate in sequence each of the test tubes carried by said support in a predetermined position relative to said enclosure, means connected to said arm for imparting back and forth shaking movement thereto, a window in said enclosure aligned with said predetermined position in which said test tubes are adapted to be located in sequence, a light source for directing light rays through said window, a photoelectric cell within said enclosure in alignment with said window and located in said housing so that rays from said light source pass through said window and the test tube in alignment therewith to effect energization of the photoelectric cell proportionate to the concentration of the preparation in the test tube, means electrically connected to said cell for measuring the degree of energization thereof, and recording means operatively associated with said measuring means for recording the measurements thereof.

6. Apparatus according to claim 5 including a control circuit for said apparatus, and switch means in said circuit operable selectively to prevent operation of said rotating means, said means for imparting shaking movement to said arm and said light source.

7. Apparatus according to claim 5 including a flask support removably mounted on said test tube support.

References Cited

UNITED STATES PATENTS

| | | | |
|---|---|---|---|
| 2,157,438 | 5/1939 | Sparks | 88—14 |
| 2,253,581 | 8/1941 | Reynolds | 250—218 |
| 2,436,145 | 2/1948 | Johnson | 250—218 X |
| 2,531,529 | 11/1950 | Price | 250—224 X |
| 2,844,067 | 7/1958 | Borg | 88—14 |
| 2,866,904 | 12/1958 | Hoellerich et al. | 250—106 |
| 2,990,339 | 6/1961 | Frank et al. | 195—103.5 X |
| 3,002,895 | 10/1961 | Freedman | 195—143 |
| 3,255,095 | 6/1966 | Ricard | 195—103.5 |
| 3,257,562 | 6/1966 | Erdman et al. | 250—218 |

OTHER REFERENCES

Peacock et al.: "An Automatic Sample Changer to be Used for Measuring Radioactive Samples," The Review of Scientific Instruments, vol. 17, No. 7, July 1946, pp. 255 to 261.

RALPH G. NILSON, *Primary Examiner.*

E. STRICKLAND, M. A. LEAVITT,

*Assistant Examiners.*